United States Patent [19]

Akashi et al.

[11] Patent Number: 4,490,762

[45] Date of Patent: Dec. 25, 1984

[54] CLEANING TAPE

[75] Inventors: Goro Akashi; Wataru Ueno, both of Kanagawa, Japan

[73] Assignee: Fuji Photo Film Co., Ltd., Kanagawa, Japan

[21] Appl. No.: 472,386

[22] Filed: Mar. 10, 1983

Related U.S. Application Data

[63] Continuation of Ser. No. 246,769, Mar. 23, 1981, abandoned.

[30] Foreign Application Priority Data

Mar. 21, 1980 [JP] Japan ................................. 55-35959
Apr. 16, 1980 [JP] Japan ................................. 55-50200

[51] Int. Cl.$^3$ ............................................... G11B 5/41
[52] U.S. Cl. ..................................... 360/128; 51/298; 51/303; 51/398

[58] Field of Search .................... 51/298, 303, 398; 360/128

[56] References Cited

U.S. PATENT DOCUMENTS

| | | | |
|---|---|---|---|
| 3,382,058 | 5/1968 | Wise et al. | 51/298 |
| 3,387,955 | 6/1968 | Buell | 51/298 |
| 3,551,125 | 12/1970 | Hallewell | 51/298 |
| 3,823,947 | 7/1974 | Sasaki | 360/128 |
| 3,931,643 | 1/1976 | Kuroe | 360/128 |
| 3,978,520 | 8/1976 | Nowicki | 358/10 |
| 4,065,798 | 12/1977 | Sugisaki et al. | 360/128 |
| 4,138,229 | 2/1979 | Tadokoro et al. | 51/298 |

Primary Examiner—James Derrington
Attorney, Agent, or Firm—Sughrue, Mion, Zinn, Macpeak and Seas

[57] ABSTRACT

A cleaning tape comprising a support having coated thereon a cleaning layer containing a binder and an organic polymer powder is disclosed.

5 Claims, No Drawings

CLEANING TAPE

This application is a continuation of application Ser. No. 246,769, filed 3/23/81, now abandoned.

BACKGROUND OF THE INVENTION

This invention relates to a cleaning tape for cleaning the magnetic head of a magnetic recording system.

A cleaning tape is used to clean a surface of recording and reproducing head, guide poles, and rollers in the tape path of an audio cassette tape recorder, video tape recorder, and other magnetic recording systems. One conventional cleaning tape comprises a support which has coated thereon a cleaning layer composed of a binder and an abrasive such as alumina ($Al_2O_3$), silicon carbide (SiC), chromium oxide ($Cr_2O_3$) or red oxide ($\alpha$-$Fe_2O_3$). This cleaning layer is effective for cleaning purposes, but because of its very strong polishing effect, it sometimes damages the head or guide poles as well as the blade of a cutter for making sized tape or splicing magnetic tape together. To eliminate these defects, a method has been proposed to mat the surface of the support by sandblasting the support rather than forming a cleaning layer containing an abrasive (Japanese Utility Model Publication No. 42726/74). However, the surface of the support provided by this method has only a limited degree of roughness (i.e., unevenness) and it sometimes occurs that the support has reduced rupture strength.

SUMMARY OF THE INVENTION

Therefore, one object of this invention is to provide a cleaning tape having an improved cleaning effect.

Another object of this invention is to provide a cleaning tape having high resistance to damage by abrasion.

The objects of this invention can be achieved by a cleaning tape having a cleaning layer made of a binder and an organic polymer powder on at least one side of a support.

DETAILED DESCRIPTION OF THE INVENTION

The organic polymer powders that can be used in the cleaning layer of the cleaning tape of this invention include both cellulose powder and resin particles. The cellulose powder can be obtained, for example, by treating wood cellulose with a chemical to decompose the non-crystalline region of the microstructure thereof, and then separating the portion of high crystallinity. The thus-produced cellulose powder comprises thin needles or rods which are generally from 10 to 500 microns long and from 5 to 50 microns thick. A typical example of the cellulose powder is KC Floc (cellulose powder produced by The Kokusaku Pulp Industry Co., Ltd.). Other cellulose powders are also commercially available. Examples of resin particles are those of polystyrene, polyethylene, polypropylene, polyamide, polyester, phenolic resin, urea resin, melamine resin, epoxy resin and phenoxy resin. Such particles are generally spherical in shape; the term "particle size" used herein refers to the average diameter of the particles. The particle size of these resins is at least 5 microns, and preferably, resin particles whose size is in the range of from 10 to 200 microns are used, depending upon the particular object. Such resin particles are commercially available.

To ensure the retention of the organic polymer powder on the support, it is conventionally mixed with a binder such as polyvinyl alcohol, polyethylene latex, vinyl chloride-vinyl acetate resin, nitrocellulose, vinylidene chloride resin, acrylic resin, methacrylic resin or a blend thereof with a thermosetting resin such as polyurethane, phenolic resin, epoxy resin, or urea resin. The mixture thus-obtained is applied to all or part of one or both sides of the support. As a coating solvent, any compound that does not dissolve the organic polymer powders can be used, such as water, methyl ethyl ketone, toluene, and methyl ethyl ketone-toluene mixture. Examples of a support and binder are described in U.S. Pat. No. 4,135,016.

The cleaning tape of this invention can be used as a polishing tape or as a leader tape by attaching it at the end of a magnetic recording tape. Since the cellulose powder particles or the resin particles are dispersed on and fixed to the surface of the support, they won't damage the head or guides while achieving efficient cleaning. Another advantage of this cleaning tape of this invention is that the rupture strength of the support is not reduced as in the case of the cleaning tape produced by sandblasting.

This invention is now described in greater detail by reference to the following examples, which are given here for illustrative purposes only, and are not intended to limit the scope of the invention. In the examples, all parts are by weight.

EXAMPLE 1

A uniform dispersion of the following ingredients was formed with a mixer, and it was applied to a polyethylene terephthalate base (35 microns thick) in a coating weight of 35 g/m$^2$ and dried.

|  | parts |
| --- | --- |
| Cellulose powder (KC Floc W-50 of The Kokusaku Pulp Industry Co., Ltd.) | 10 |
| Nitrocellulose (viscosity measured by a ball viscometer: RS ⅛) | 8 |
| Castor oil | 0.6 |
| Ethyl acetate | 180 |

The tape roll thus-produced was slit into 3.81 mm wide tape samples which were used as cleaning tapes. It was found that they caused minimum wear of the head or guide poles, yet retained high cleaning effect.

EXAMPLE 2

A uniform dispersion of the following ingredients was formed with a mixer, and it was applied to a polyethylene terephthalate base (35 microns thick) in a coating weight of 30 g/m$^2$ and dried.

|  | parts |
| --- | --- |
| Polyethylene particles (av. size: 30μ) | 10 |
| Nitrocellulose (RS ⅛) | 8 |
| Triphenyl phosphate (TPP) | 0.6 |
| Butyl acetate | 180 |

The tape roll thus-produced was slit into 3.81 mm wide tape samples, which were used as cleaning tapes, and which proved as effective as those in Example 1.

While the invention has been described in detail and with reference to specific embodiments thereof, it will be apparent to one skilled in the art that various changes and modifications can be made therein without departing from the spirit and scope thereof.

What is claimed is:

1. A magnetic head cleaning tape comprising a polyethelene terephthelate support having coated thereon a cleaning layer consisting essentially of a binder and uniformly dispersed therein resin particles having an averge particle size of 5–200μ.

2. A cleaning tape as in claim 1, wherein said resin particles are selected from the group consisting of polystyrene, polyethylene, polypropylene, polyamide, polyester, phenolic resin, urea resin, melamine resin, epoxy resin and phenoxy resin.

3. A cleaning tape as in claim 1, wherein said resin particles have a size in the range of from 10 to 200μ.

4. A cleaning tape as in claim 1, wherein said binder is selected from the group consisting of polyvinyl alcohol, polyethylene latex, vinyl chloride-vinyl acetate resin, nitrocellulose, vinylidene chloride resin, acrylic resin and methacrylic resin or a blend thereof with a thermosetting resin selected from th group consisting of polyurethane, phenolic resin, epoxy resin and urea resin.

5. In a magnetic recording medium with a cleaning leader tape at the end of a magnetic recording tape, said cleaning leader tape comprising a polyethelene terephthelate support having coated thereon a cleaning layer comprising a binder and uniformly dispersed therein resin particles having an average particle size of 5–200 μ.

* * * * *